(12) United States Patent
Prados (10) Patent No.: US 7,607,087 B2
(45) Date of Patent: *Oct. 20, 2009

(54) INPUT DEVICE

(75) Inventor: Michael Prados, San Francisco, CA (US)

(73) Assignee: Volkswagen AG, Wolfsburg (DE)

( * ) Notice: Subject to any disclaimer, the term of this patent is extended or adjusted under 35 U.S.C. 154(b) by 610 days.

This patent is subject to a terminal disclaimer.

(21) Appl. No.: 11/051,051

(22) Filed: Feb. 2, 2005

(65) Prior Publication Data

US 2005/0225539 A1 Oct. 13, 2005

Related U.S. Application Data

(60) Provisional application No. 60/541,411, filed on Feb. 2, 2004.

(51) Int. Cl.
*G06F 3/01* (2006.01)
*G06F 3/041* (2006.01)

(52) U.S. Cl. .................. 715/701; 715/702; 345/156; 345/173

(58) Field of Classification Search .......... 345/156, 345/173, 157, 160, 161, 163, 164, 168; 340/425.5; 178/178, 18.01, 18.03, 18.04, 18.05, 18.06, 178/18.07, 18.09, 18.11; 715/700, 701, 702
See application file for complete search history.

(56) References Cited

U.S. PATENT DOCUMENTS

| | | | |
|---|---|---|---|
| 6,118,435 A | 9/2000 | Fujita et al. | |
| 6,429,846 B2 * | 8/2002 | Rosenberg et al. | 345/156 |
| 6,871,384 B2 * | 3/2005 | Novin et al. | 16/337 |
| 2002/0033795 A1 | 3/2002 | Shahoian et al. | |
| 2002/0167789 A1 * | 11/2002 | Novin et al. | 361/681 |
| 2005/0122317 A1 * | 6/2005 | Schaaf et al. | 345/173 |
| 2006/0146036 A1 * | 7/2006 | Prados et al. | 345/173 |
| 2006/0146037 A1 * | 7/2006 | Prados et al. | 345/173 |
| 2006/0146039 A1 * | 7/2006 | Prados et al. | 345/173 |
| 2007/0057924 A1 * | 3/2007 | Prados et al. | 345/173 |
| 2007/0057927 A1 * | 3/2007 | Prados | 345/173 |
| 2007/0057928 A1 * | 3/2007 | Prados et al. | 345/173 |
| 2007/0097094 A1 * | 5/2007 | Prados et al. | 345/173 |
| 2007/0146343 A1 * | 6/2007 | Prados | 345/173 |
| 2008/0024457 A1 * | 1/2008 | Fliegner et al. | 345/173 |

FOREIGN PATENT DOCUMENTS

| | | |
|---|---|---|
| DE | 197 31 285 | 1/1999 |
| DE | 201 02 197 | 7/2001 |
| DE | 201 80 024 | 1/2002 |
| EP | 0 836 362 | 4/1998 |
| WO | WO 99/66763 | 12/1999 |
| WO | WO 01/33103 | 5/2001 |
| WO | WO 01/54109 | 7/2001 |
| WO | WO 03/003880 | 5/2003 |
| WO | WO 03/041046 | 5/2003 |

* cited by examiner

*Primary Examiner*—My-Chau T Tran
(74) *Attorney, Agent, or Firm*—Kenyon & Kenyon LLP (57) ABSTRACT

An input device, e.g., for a motor vehicle, includes: a touch screen for the input of commands by touching a control panel or by pressing on the control panel; an actuator for moving the touch screen in at least one direction with respect to a reference body; and an substantially unshaped spring for the mechanical connection of the touch screen to the reference body.

25 Claims, 9 Drawing Sheets

INPUT DEVICE

CROSS-REFERENCE TO RELATED APPLICATIONS

The present application claims the benefit of U.S. Provisional Application Ser. No. 60/541,411, filed on Feb. 2, 2004, which is expressly incorporated herein in its entirety by reference thereto.

FIELD OF THE INVENTION

The present invention relates to an input device, e.g., for a motor vehicle, having a touch screen.

BACKGROUND INFORMATION

A touch screen is described, for example, in German Published Utility Model No. 201 02 197 U, which is expressly incorporated herein in its entirety by reference thereto. German Published Utility Model No. 201 02 197 U describes a touch screen for visually representing electronic signals and for inputting signs and symbols by touching the screen for confirmation purposes. It includes a functional plane for visual representation and keystroke input and a higher-level protective plane corresponding thereto that is deformable at certain points. In this context, when certain points of the functional plane are selected by touching-type contact across the protective plane, at least one confirmation signal is generated for the user's sense of touch (haptic stimulus) that is perceptible at the position of the point of contact in the deformed protective plane, and the confirmation signal for the sense of touch (haptic stimulus) is generated by vibration elements eccentrically positioned within and/or underneath the functional plane. In addition, in the touch screen described in German Published Utility Model No. 201 02 197 U, the generated vibrations are transmitted from the functional plane to the protective plane as the result of direct contacting of the two planes and/or via the edge regions of the planes by way of rigid or elastic connecting elements.

Details concerning touch screens may be gathered, for example, from the Internet page www.3m.com/3mtouchsystems. For example, the following touch screens are believed to offered by 3M™:

MicroTouch™ 12.1" FPD Touch Monitor (see www.3m.com/3mtouchsystems/Products/Monitors/FPDdesktop.jhtml)

MicroTouch™ M150 FPD Touch Monitor (see www.3m.com/3mtouchsystems/Products/Monitors/M150.jhtml)

MicroTouch™ CRT Touch Monitors (see www.3m.com/3mtouchsystems/Products/Monitors/CRTdesktop.jhtml)

MicroTouch™ Chassis TouchTM FPD Touch Monitors (see www.3m.com/3mtouchsystems/Products/Monitors/FPDchassis.jhtml)

MicroTouch™ Chassis TouchTM CRT Touch Monitor (see www.3m.com/3mtouchsystems/Products/Monitors/CRTchassis.jhtml), www.3m.com/3mtouchsystems/Products/Resistive/5-wire.jhtml, www.3m.com/3mtouchsystems/Products/Resistive/PL.jhtml, www.3m.com/3mtouchsystems/Products/Resistive/FG.jhtml, www.3m.com/3mtouchsystems/Products/Resistive/SRTS.jhtml.

Further details concerning touch screens may be obtained from the following Internet pages as well:
www.elotouch.com/products/default.asp
www.3m.com/3mtouchsystems/Products/Resistive/5-wire.jhtml
www.3m.com/3mtouchsystems/Products/Resistive/PL.jhtml
www.3m.com/3mtouchsystems/Products/Resistive/FG.jhtml
www.3m.com/3mtouchsystems/Products/Resistive/SRTS.jhtml
www.elotouch.com/products/default.asp Furthermore, German Published Utility Model No. 201 80 024 U and PCT International Published Patent Application No. WO 01/54109, each of which is expressly incorporated herein in its entirety by reference thereto, describe a touch-sensitive control featuring haptic feedback for inputting signals into a computer and for outputting forces to a user of the touch-sensitive control, the touch-sensitive control having a touch-screen input device which has a virtually planar touch-screen surface. On the basis of a position on the touch-screen surface that is touched by a user, a positional signal is input into a processor of the computer, the positional signal reproducing the position in two dimensions. The touch-sensitive control described in PCT International Published Patent Application No. WO 01/54109 also has at least one actuator, which is connected to the touch-sensitive input device, the actuator outputting a force to the touch-sensitive input device so as to provide the user touching the touch-sensitive surface with a haptic sensation, the actuator outputting the force directly to the touch-sensitive input device on the basis of the force information output by the processor.

Haptic feedback is also described in U.S. Pat. No. 6,429,846, PCT International Published Patent Application No. WO 03/038800 and PCT International Published Patent Application No. WO 03/41046, each of which is expressly incorporated herein in its entirety by reference thereto.

German Published Patent Application No. 197 31 285 describes an operating element for a device having a plurality of selectable menus, functions, and/or functional values. Its operating surface is understandable to the user and, by locally moving or touching the operating surface, the user is able to make his/her selection. The form of the operating surface can be altered to conform with the selected and/or selectable menu, function and/or functional value.

SUMMARY

According to an example embodiment of the present invention, an input device having a touch screen is provided. The input device may be suitable for use in motor vehicles, and such an input device may be characterized, e.g., by a long service life at relatively low cost.

According to an example embodiment of the present invention, an input device, e.g., for a motor vehicle, includes a touch screen for the input of commands by touching a control panel or by pressing on the control panel; an actuator for moving the touch screen in at least one direction with respect to a reference body; and a substantially u-shaped spring for the mechanical connection of the touch screen to the reference body.

Such a reference body may be a component of a motor vehicle such as a steering wheel, a console, etc. It may be provided that the touch screen is arranged for the visual display of information as well. However, in an example embodiment, a display for the visual display of information is arranged underneath the (transparent) touch screen, the touch screen being moveable with respect to the display, e.g., in a direction substantially in parallel to the control panel.

The display may be the reference body within the present context or at least part of the reference body within the present context.

In an example embodiment of the present invention, the input device includes at least three, e.g., four, substantially u-shaped springs for the mechanical connection of the touch screen to the reference body.

In an example embodiment of the present invention, the substantially u-shaped spring has an opening, which, for example, is 5 mm to 30 mm wide and is substantially directed toward the touch screen. Moreover, in an example embodiment of the present invention, the substantially u-shaped spring has an apex located substantially opposite from the opening, the substantially u-shaped spring being aligned such that an imaginary line extending through the apex and through the opening extends substantially in parallel to the control panel.

In an example embodiment of the present invention, the actuator is arranged such that the touch screen is moveable via the actuator substantially in parallel to the control panel, e.g., by a rotary motion of the actuator.

In an example embodiment of the present invention, the substantially u-shaped spring has a thickness of 0.5 mm to 2 mm. The spring in an example embodiment of the present invention is made of plastic. Such a plastic may include, e.g., polycarbonate, ABS, acetal, polyethylene, etc. The substantially u-shaped springs may be produced from acetal.

In an example embodiment of the present invention, the substantially u-shaped spring has a spring constant (stiffness) that is adapted to a mass of the touch screen such that the touch screen in combination with the substantially u-shaped spring (or all springs) has a mechanical natural frequency of 5 Hz to 150 Hz, e.g., a natural frequency of 30 Hz to 75 Hz.

In an example embodiment of the present invention, the substantially u-shaped spring has two spring arms, an opening arranged between the two spring arms, and a connection point at which the two spring arms are joined, the substantially u-shaped spring having a main-spring constant in parallel to the opening, and a secondary-spring constant extending in a direction extending through the connection point and through the opening. The secondary-spring constant is at least two times the main-spring constant, e.g., at least three times the main-spring constant. In an example embodiment of the present invention, the substantially u-shaped spring has two spring arms, an opening disposed between the two spring arms, and a connection point at which the two spring arms are joined, the substantially u-shaped spring having a main-spring constant in parallel to the opening, and the substantially u-shaped spring having a secondary-spring constant perpendicular to the opening, the secondary-spring constant being at least two times the main-spring constant. Suitable springs may include those in which the secondary-spring constant is at least four times the main-spring constant.

In an example embodiment of the present invention, the substantially u-shaped spring has two spring arms, an opening disposed between the two spring arms, and a connection point at which the two spring arms are joined, the substantially u-shaped spring having a main-spring constant in parallel to the opening and the control panel. However, perpendicular to the opening, but in parallel to the control panel, the substantially u-shaped spring has a secondary-spring constant, the secondary-spring constant being at least two times, e.g., three times, the main-spring constant. Suitable springs may include those in which the secondary-spring constant is at least four times the main-spring constant.

In an example embodiment of the present invention, the input device includes at least two substantially u-shaped springs and at least one mechanical connection element for connecting the at least two substantially u-shaped springs; the mechanical connection element and the at least two substantially u-shaped springs being produced jointly as one piece, i.e., cast, for example. In an example embodiment of the present invention, the input device includes at least three substantially u-shaped springs and at least one frame for connecting the at least three substantially u-shaped springs and for accommodating the touch screen, the frame and the at least three substantially u-shaped springs being produced jointly as one piece, i.e., cast, for example. In an example embodiment of the present invention, the input device includes at least four substantially u-shaped springs and at least one frame for connecting the four substantially u-shaped springs and for accommodating the touch screen, the frame and the at least four substantially u-shaped springs being produced jointly as one piece, i.e., cast, for example.

In an example embodiment of the present invention, the substantially u-shaped spring holds the touch screen freely suspended with respect to the reference body, e.g., without a ball bearing and a ball-bearing-type element and/or a gliding surface.

In an example embodiment of the present invention, the input device includes a control for controlling the actuator, the actuator being controllable by the control such that the touch screen is movable via the actuator in a direction substantially in parallel to the control panel for confirming a command input via the touch screen, e.g., for a period of 50 and 800 ms, e.g., for 100 ms and 400 ms. The movement may occur periodically, for example, at a natural frequency of a vibration system of a spring and mass of the touch screen. The periodic movement may be a decaying oscillation, for example, having an envelope curve with an exponential component.

In an example embodiment of the present invention, an input device, e.g., for a motor vehicle, includes a touch screen for the input of commands by touching a control panel or by pressing on the control panel; an actuator for moving the touch screen in at least one direction with respect to a reference body; and a spring for the mechanical connection of the touch screen to the reference body. The spring has a main-spring constant in a main direction extending in parallel to the control panel, and it has a secondary-spring constant in a secondary direction that extends in parallel to the control panel, but perpendicular to the main direction, the secondary-spring constant being at least two times, e.g., three times, that of the main spring. Suitable springs may include those in which the secondary-spring constant is at least four times that of the main spring.

An aforementioned reference body may be a component of a motor vehicle, such as a steering wheel, a console, etc. It may be provided that the touch screen is arranged for the visual display of information as well. In an example embodiment, however, a display for the visual representation of information is arranged underneath the (transparent) touch screen, the touch screen being moveable with respect to the display, e.g., in a direction substantially in parallel to the control panel. The display may be the reference body within the present context or at least part of the reference body within the present context.

In an example embodiment of the present invention, the input device includes at least three, e.g., four, springs for the mechanical connection of the touch screen to the reference body.

In an example embodiment of the present invention, the actuator is arranged such that the touch screen is moveable via the actuator, substantially in parallel to the control panel, e.g., by a rotary motion of the actuator.

In an example embodiment of the present invention, the spring has a thickness of 0.5 mm to 2 mm. The spring in an example embodiment of the present invention is made substantially of plastic. Such a plastic may include, e.g., polycarbonate, ABS, acetal, polyethylene, etc. Suitable springs may be produced from acetal.

In an example of the present invention, the spring has a spring constant (stiffness) that is adapted to a mass of the touch screen such that the touch screen in combination with the spring (or all springs) has a mechanical natural frequency of 5 Hz to 150 Hz, e.g., a natural frequency of 30 Hz to 75 Hz.

In an example embodiment of the present invention, the input device includes at least two springs and at least one mechanical connection element for the connection of the at least two springs, the mechanical connection element and the at least two springs being produced jointly as one piece, i.e., cast, for example. In an example embodiment of the present invention, the input device includes at least three springs and at least one frame for connecting the at least three springs and for accommodating the touch screen, the frame and the at least three springs being produced jointly as one piece, i.e., cast, for example. In an example embodiment of the present invention, the input device includes at least four springs and at least one frame for connecting the at least four springs and for accommodating the touch screen, the frame and the at least four springs being produced jointly as one piece, i.e., cast, for example.

In an example embodiment of the present invention, the spring holds the touch screen freely suspended with respect to the reference body, e.g., without a ball bearing and a ball-bearing-type element and/or a gliding surface.

In an example embodiment of the present invention, the input device includes a control for controlling the actuator, the actuator being controllable by the control such that, for confirming a command input via the touch screen, the touch screen is movable via the actuator in a direction substantially in parallel to the control panel, e.g., for a period of 50 ms and 800 ms, e.g., 100 ms and 400 ms. The movement may occur periodically, for example, at a natural frequency of a vibration system of a spring and mass of the touch screen. The periodic movement may be a decaying oscillation, for example, having an envelope curve with an exponential component.

In an example embodiment of the present invention, an input device, e.g., for a motor vehicle, includes a touch screen for the input of commands by touching a control panel or by pressing on the control panel; an actuator for moving the touch screen in at least one direction with respect to a reference body, at least two, e.g., at least three, springs for the mechanical connection of the touch screen to the reference body; and a frame for connecting the at least two springs and for accommodating the touch screen, the frame and the at least two springs being produced jointly as one piece, i.e., cast, for example. In an example embodiment of the present invention, the input device has four springs.

An aforementioned reference body may be a component of a motor vehicle, such as a steering wheel, a console, etc. It may be provided that the touch screen is arranged for the visual representation of information as well. However, in an example embodiment, a display for the visual display of information is arranged underneath the (transparent) touch screen, the touch screen being moveable with respect to the display, e.g., in a direction substantially in parallel to the control panel. The display may be the reference body within the present context or at least part of the reference body within the present context.

In an example embodiment of the present invention, the actuator is arranged such that the touch screen is moveable with the aid of the actuator, e.g., substantially in parallel to the control panel, e.g., by a rotary motion of the actuator.

The springs in an example embodiment of the present invention are made substantially from plastic. Such a plastic may include, e.g., polycarbonate, ABS, acetal, polyethylene, etc. Suitable unshaped springs may be produced from acetal.

In an example embodiment of the present invention, the springs each have a spring constant (stiffness) that is adapted to a mass of the touch screen such that the touch screen in combination with the springs has a mechanical natural frequency of 5 Hz to 150 Hz, e.g., a natural frequency of 30 Hz to 75 Hz.

In an example embodiment of the present invention, the springs hold the touch screen freely suspended with respect to the reference body, e.g., without a ball bearing and a ball-bearing-type element and/or a gliding surface.

In an example embodiment of the present invention, the input device includes a control for controlling the actuator, the actuator being controllable by the control such that the touch screen is movable via the actuator in a direction substantially in parallel direction to the control panel for confirming a command input via the touch screen, e.g., for a period of 50 ms and 800 ms, e.g., 100 ms and 400 ms. The movement may occur periodically, for example, at a natural frequency of a vibration system of the of spring and mass of the touch screen. The periodic movement may be a decaying oscillation, for example, having an envelope curve with an exponential component.

In an example embodiment of the present invention, an input device, e.g., for a motor vehicle, includes a touch screen for the input of commands by touching a control panel or by pressing on the control panel; an actuator for moving the touch screen in at least one direction with respect to a reference body; and a spring, e.g., made of plastic, for the mechanical connection of the touch screen to the reference body. Such a plastic may include, e.g., polycarbonate, ABS, acetal, polyethylene, etc. Suitable springs may be produced from acetal.

An aforementioned reference body may be a component of a motor vehicle, such as a steering wheel, a console, etc. It may be provided that the touch screen is arranged for the visual display of information as well. However, in an example embodiment, a display for the visual display of information is arranged underneath the (transparent) touch screen, the touch screen being moveable with respect to the display, e.g., in a direction substantially in parallel to the control panel. The display may be the reference body within the present context or at least part of the reference body within the present context.

In an example embodiment of the present invention, the input device includes at least three, e.g., four springs, which substantially are made from plastic, for the mechanical connection of the touch screen to the reference body.

In an example embodiment of the present invention, the spring holds the touch screen freely suspended with respect to the reference body, e.g., without a ball bearing and a ball-bearing-type element and/or a gliding surface.

In an example embodiment of the present invention, the input device includes a control for controlling the actuator, the actuator being controllable by the control such that the touch screen is movable via the actuator in a direction substantially in parallel to the control panel, for confirming a command input via the touch screen, e.g., for a period of 50 ms and 800 ms, e.g., 100 ms and 400 ms. The movement may occur periodically, for example, at a natural frequency of a vibration system of a spring and mass of the touch screen. The periodic movement may be a decaying oscillation, for example, having an envelope curve with an exponential component.

In an example embodiment of the present invention, an input device, e.g., for a motor vehicle, includes a touch screen for the input of commands by touching a control panel or by pressing on the control panel, an actuator for moving the touch screen in at least one direction with respect to a reference body, and at least one spring for the mechanical connection of the touch screen to the reference body, the spring holding the touch screen freely suspended with respect to the reference body, e.g., without a ball bearing and a ball-bearing type element and/or a sliding surface.

Such a reference body may be a component of a motor vehicle, such as a steering wheel, a console, etc. It may be provided that the touch screen is arranged for the visual display of information as well. However, in an example embodiment, a display for the visual display of information is arranged underneath the (transparent) touch screen, the touch screen being moveable with respect to the display, e.g., in a direction substantially in parallel to a control panel. The display may be the reference body within the present context or at least part of the reference body within the present context.

In an example embodiment of the present invention, the input device includes a control for controlling the actuator, the actuator being controllable by the control such that the touch screen is movable via the actuator in a direction substantially in parallel to the control panel, for confirming a command input via the touch screen, e.g., for a period of 50 ms and 800 ms, e.g., 100 ms and 400 ms. The movement may occur periodically, for example, at a natural frequency of a vibration system of a spring and mass of the touch screen. The periodic movement may be a decaying oscillation, for example, having an envelope curve with an exponential component.

In an example embodiment of the present invention, a display device, e.g., for a motor vehicle, includes a transparent touch screen for the input of commands by touching a control panel or by pressing on the control panel; a display, disposed underneath the touch screen, for the visual display of information; an actuator for moving the touch screen with respect to the display in at least one direction, substantially in parallel to the control panel; and a control for controlling the actuator, the actuator being controllable by the control such that the touch screen is moveable with respect to the display by the actuator, e.g., in a direction substantially in parallel to the control panel, for confirming a command input via the touch screen.

In an example embodiment of the present invention, the actuator is controllable by the control such that the touch screen is movable via the actuator in a direction substantially in parallel to the control panel for confirming a command input via the touch screen, e.g., for a period of 50 ms and 800 ms, e.g., 100 ms and 400 ms. The movement may occur periodically, for example, at a natural frequency of a vibration system of a spring and mass of the touch screen. The periodic movement may be a decaying oscillation, for example, having an envelope curve with an exponential component.

A motor-vehicle within the present context may include, for example, a land vehicle that may be used individually in traffic. However, motor vehicles within the present context are not restricted to land vehicles having an internal combustion engine.

Further features and aspects hereof are set forth below in the following description with reference to the appended Figures.

DETAILED DESCRIPTION

Figure 1:
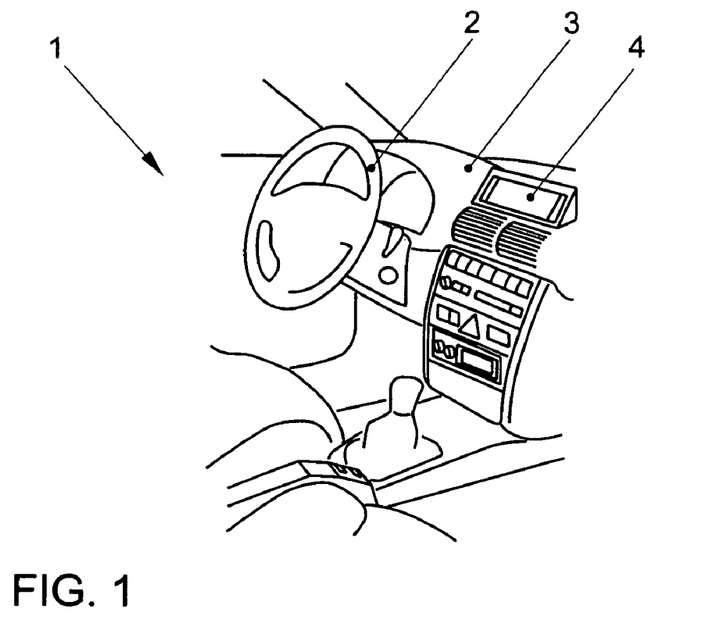
FIG. 1 illustrates an exemplary embodiment for a cockpit of a motor vehicle.
Figure 2:
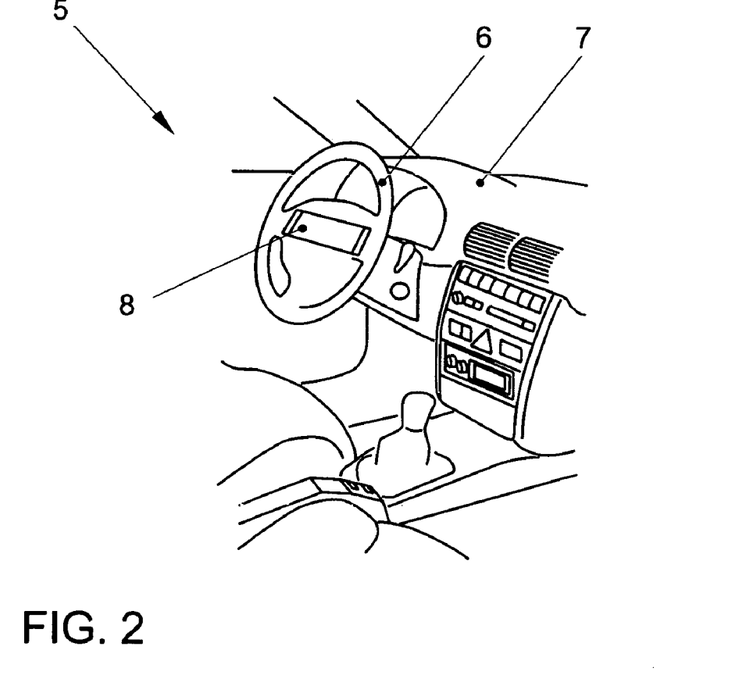
FIG. 2 illustrates a further exemplary embodiment for a cockpit of a motor vehicle.

FIG. 1 illustrates an exemplary embodiment for a cockpit 1 of a motor vehicle. In cockpit 1, a steering wheel 2 is arranged below an instrument panel or dashboard 3. Dashboard 3 has an input device 4 arranged adjacent to steering wheel 2. FIG. 2 illustrates an exemplary embodiment for a cockpit 5 of a motor vehicle in which a steering wheel 6 is arranged underneath a dashboard 7 in cockpit 5. However, departing from the exemplary embodiment illustrated in FIG. 1, an input device 8 is positioned in steering wheel 6.

Figure 3:
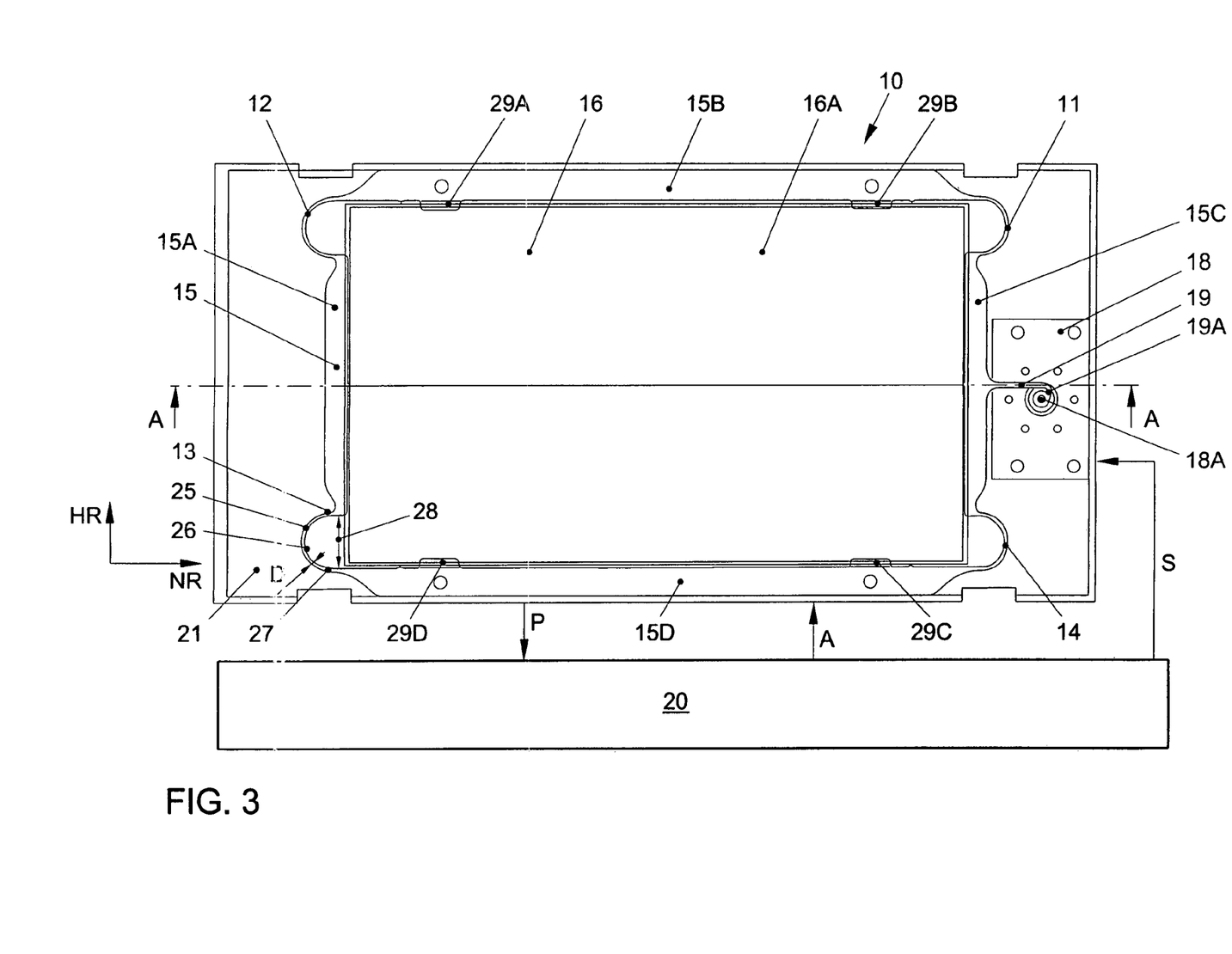
FIG. 3 illustrates an input device.
Figure 4:
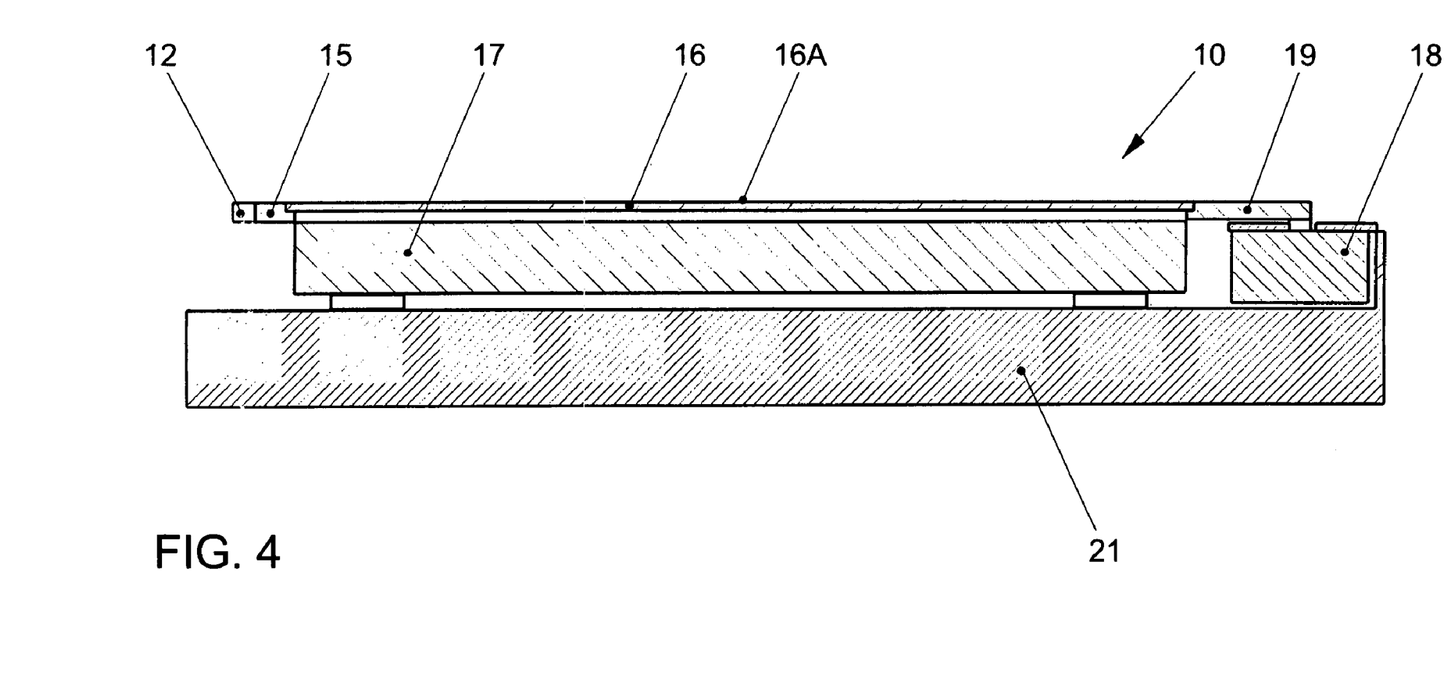
FIG. 4 is a cross-sectional view of the input device illustrated in FIG. 3 taken along section line A-A.

FIG. 3 illustrates—as possible exemplary embodiment for an input device 4 or 8—an input device 10 for the visual display of information and for the input of commands, in a plan view. FIG. 4 is a cross-sectional view of input device 10 taken along sectional line A-A. Input device 10 has a transparent touch screen 16, which is arranged above a display 17 and has a control panel 16A. Display 17 is connected to a reference body 21 via mounting supports 29A, 29B, 29C and 29D. Reference body 21 may be part of dashboard 3, steering wheel 6, etc.

Touch screen 16 may include a force sensor (or similar sensor) in accordance with which a user-exerted pressure on touch screen 16 may be ascertained. In this manner, using touch screen 16, it is possible to distinguish touching of touch screen 16 by a user from an intentional operation by pressing on touch screen 16. For example, in this case, exerting pressure on touch screen 16 at a location indicated as control element results in an operation of touch screen 16, but not, however, simple touching of touch screen 16 by a user in a location shown as control element. Such an arrangement may be advantageous for use in motor vehicles.

Touch screen 16 is supported by a frame 15. Frame 15 has four u-shaped springs 11, 12, 13, 14, which are interconnected by connecting elements 15A, 15B, 15C and 15D. Frame 15 is a casting of plastic, i.e., u-shaped springs 11, 12, 13, 14 are cast jointly with connecting elements 15A, 15B, 15C and 15D from one piece of plastic. Such a plastic may include, for example, polycarbonate, ABS, acetal, polyethylene, etc. Suitable u-shaped springs may be produced from acetal. Polycarbonate may be suitable for producing excellent springs at a cost-effective price.

The frame is bonded to touch screen 16 at connection elements 15A and 15C. Alternatively and/or additionally, touch screen 16 is supported in the frame by prestressing of u-shaped springs 11, 12, 13, 14.

Frame 15 has a (flexible) connecting piece 19, which is joined to connecting element 15C. Connecting piece 19 has a curved region 19A, which surrounds an eccentric drive-shaft neck 18A of an actuator 18 arranged as electromotor. The rotary motion of actuator 18 is converted into a linear motion. Actuator 18 is configured as direct current (brush) motor. However, other arrangements in conjunction with a different type of connection to frame 15, such as piezo actuators or so-called voice coils, etc., may be used as well.

U-shaped springs 11, 12, 13, 14 each have two spring arms 25 and 27, an opening 28 disposed between the two spring arms 25 and 27, and a connection point 26 at which both spring arms 25 and 27 are joined. Substantially in parallel to opening 28, u-shaped springs 11, 12, 13, 14 have a main-spring constant and, substantially perpendicular to opening 28, they have a secondary-spring constant. The secondary-spring constant is at least four times as high as the main-spring constant. In an exemplary embodiment, the main-spring constant refers to a direction denoted by main direction HR in FIG. 3, and the secondary-spring constant relates to a direction denoted by secondary direction NR in FIG. 3. Main direction HR and secondary direction NR are orthogonal with respect to one another, but extend in parallel to control panel 16A.

U-shaped springs 11, 12, 13, 14 have a thickness D of 0.5 mm to 2 mm, and of 0.8 mm in an exemplary embodiment. The width of opening 28 amounts to between 5 mm and 30 mm. The specific width of opening 28 is selected as a function of the material, such that a desired main-spring constant may be obtained. The main-spring constant is adapted to a mass of touch screen 16 such that touch screen 16 in combination with u-shaped springs 11, 12, 13, 14 has a mechanical natural frequency of 5 Hz to 150 Hz, e.g., a natural frequency of 30 Hz to 75 Hz. In an exemplary embodiment, the natural frequency is 55 Hz. A natural frequency within the present context may be, for example, the smallest mechanical resonant frequency of the system of u-shaped springs 11, 12, 13, 14 and touch screen 16.

Figure 5:
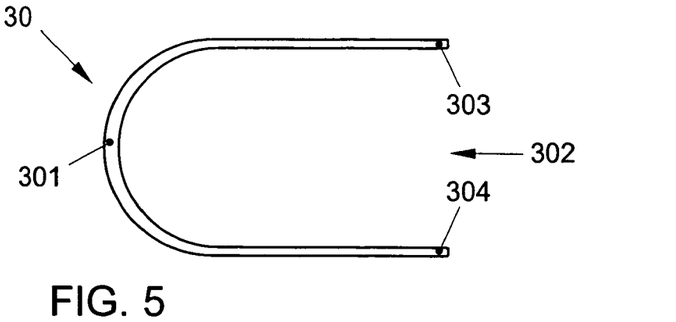
FIG. 5 illustrates an exemplary embodiment of a spring.
Figure 6:
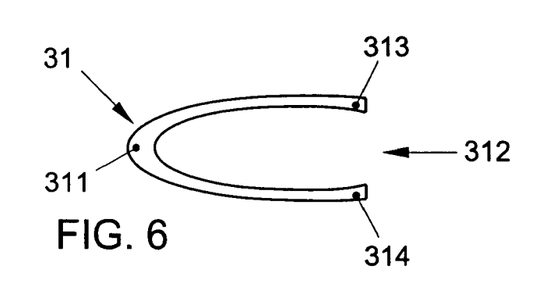
FIG. 6 illustrates another exemplary embodiment of a spring.
Figure 7:
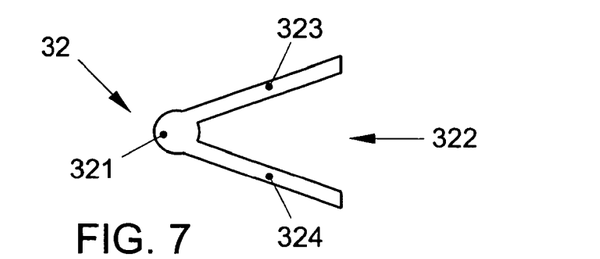
FIG. 7 illustrates another exemplary embodiment of a spring.
Figure 8:
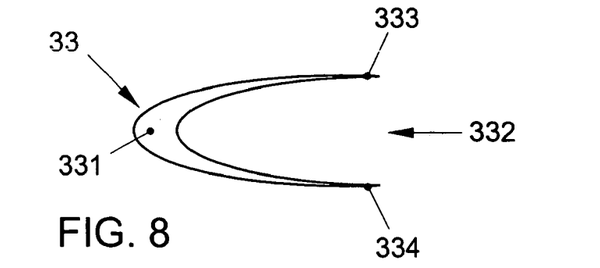
FIG. 8 illustrates another exemplary embodiment of a spring.
Figure 9:
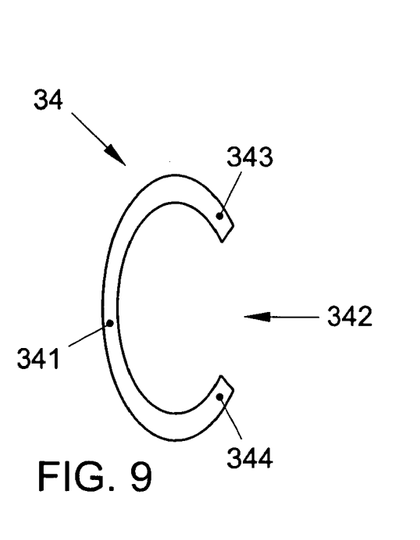
FIG. 9 illustrates another exemplary embodiment of a spring.
Figure 10:
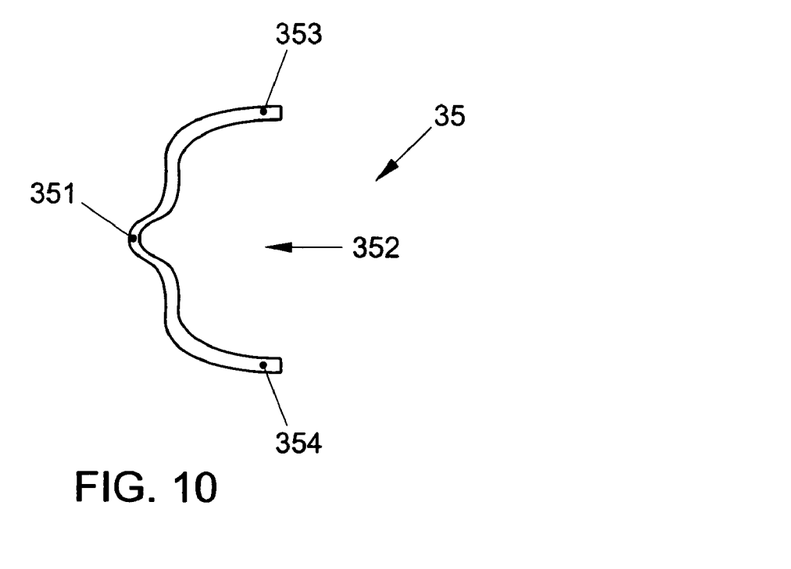
FIG. 10 illustrates another exemplary embodiment of a spring.

U-shaped springs within the present context should be understood to include springs having two spring arms. U-shaped springs within the present context should be understood to include, for example, semi-circular springs 11, 12, 13, 14 as illustrated in FIG. 3, or to include u-shaped springs 30 in the strictest sense, as illustrated in FIG. 5. U-shaped springs within the present context should be understood to include, for example, springs 30, 31, 32, 33, 34 and 35 as illustrated in FIGS. 5 to 10. Reference numerals 301, 311, 321, 331, 341 and 351 each denote connection points arranged between two springs arms in each case, e.g., 303 and 304, 313 and 314, 323 and 324, 333 and 334, 343 and 344, and 353 and 354, respectively. Reference numerals 302, 312, 322, 332, 342 and 352 each denote openings arranged between two spring arms in each case, e.g., 303 and 304, 313 and 314, 323 and 324, 333 and 334, 343 and 344 as well as 353 and 354.

Touch screen 16 and display 17 as illustrated in FIG. 3 and FIG. 4 are data-technically connected to a control 20 by which a signal A which includes information to be displayed on display 17 is transmitted to display 17. From touch screen 16, control 20 receives a signal P that indicates where a user of touch screen 16 is touching touch screen 16 and/or—if provided—whether the user is pressing on a position marked as input position on touch screen 16 such that it is to be understood as an input. It may be provided, for example, that an input is effected by simple touching of touch screen 16. However, provision may also be made that an input is not effected by simple touching of touch screen 16, but rather by (light) pressure on touch screen 16. The latter may be a procedure particularly suited for use in motor vehicles.

Figure 11:
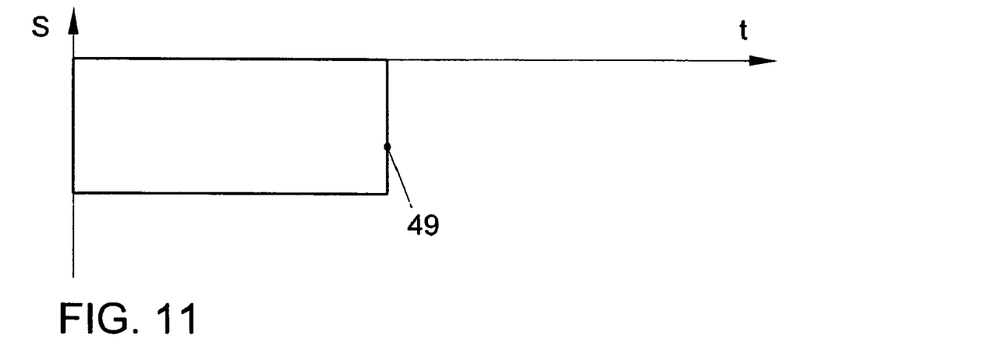
FIG. 11 illustrates a simple control signal.
Figure 12:
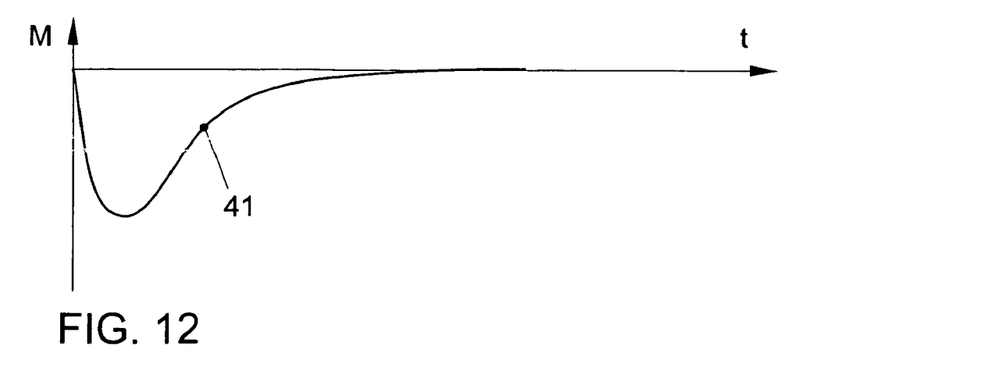
FIG. 12 illustrates a movement of the touch screen in a direction substantially in parallel to the touch screen.

As confirmation of the input of a command, the control generates a control signal S, which lasts at least 50 ms and by which actuator 18 is moved briefly. The individual components of the input device are dimensioned such that touch screen 16 is deflected by less than 1 mm. A control signal S may be, for example, a simple step function 49, illustrated in FIG. 11 over time t, or it may be a control signal for producing a more complex movement. FIG. 12 illustrates an exemplary embodiment for a movement 41 of touch screen 16 as confirmation of an input via touch screen 16 over time t. M denotes the deflection of touch screen 16 in a direction in parallel to touch screen 16, M being less than 1 mm. In this context, the deflection of touch screen 16 takes place for a period of between 50 ms and 800 ms, e.g., for a period of between 100 ms and 400 ms. Some test subjects may prefer a movement of touch screen 16 initiated by a step function.

Figure 13:
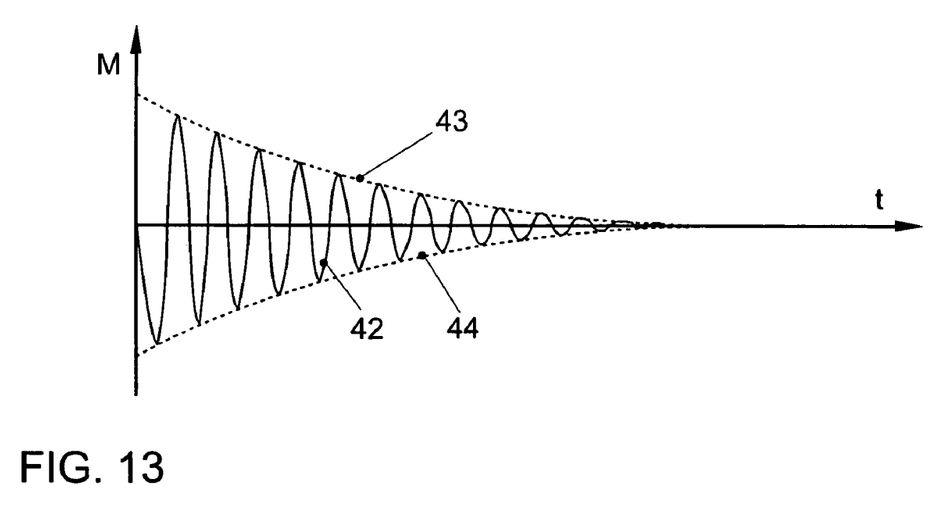
FIG. 13 illustrates a movement of the touch screen in a direction substantially in parallel to the touch screen.
Figure 14:
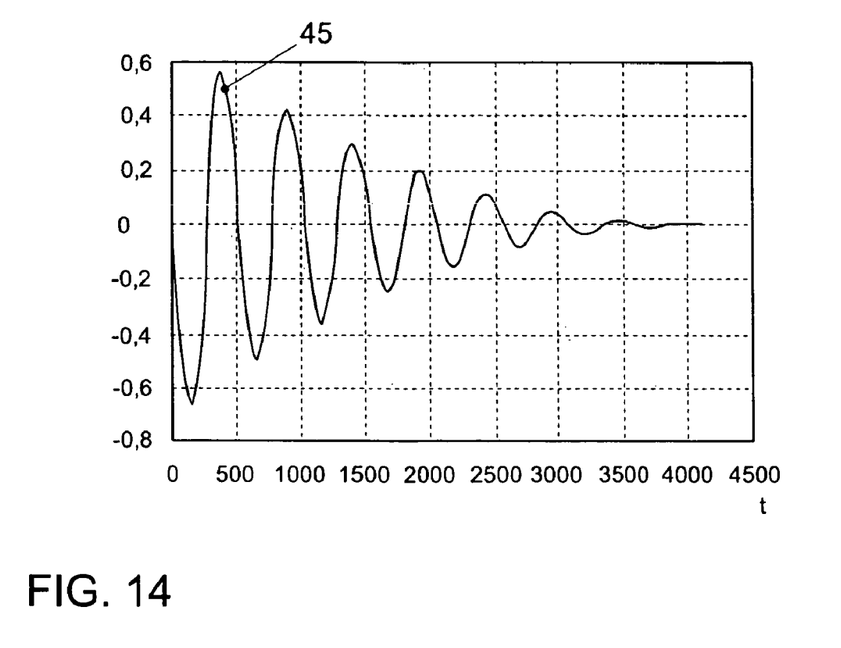
FIG. 14 illustrates another control signal.

In an example embodiment that may be preferred by other test subjects, touch screen 16 is moveable in a direction in parallel to touch screen 16 with a decaying oscillation 42, to confirm the command input via touch screen 16—as illustrated in FIG. 13 as deflection M of touch screen 16 over time t. Decaying oscillation 42 has an envelope curve 43 and 44, respectively, having an exponential component. Envelope curve 43 or 44 has a term $t^a$ or a term $b^t$, a and b being variables. Thus, envelope curve 43 and 44 may be a function of $a1+a2 \cdot t^{a3}$ or $b1+b2^t$, where a1, a2, a3, b1 and b2 are variables. In addition, decaying oscillation 42 has a frequency between 5 Hz and 80 Hz. FIG. 14 illustrates another control signal 45 for moving touch screen 16 in a direction substantially in parallel to touch screen 16, over time t in sampling points, one sampling interval being 51.2 μs. Control signal 45 is illustrated normalized to its maximum value. It has a frequency of 38.1 Hz and has decayed after 210 ms, the decay taking place according to a quadratic relation.

In an example embodiment, input devices 4 and 8 arranged in accordance with input device 10 may replace a display and operating device as described, for example, in PCT International Published Patent Application No. WO 00/21795, which is expressly incorporated herein in its entirety by reference thereto, while retaining their menu-driven functionality. FIGS. 15 to 20 illustrate various masks that are representable by an input device 40. In this context, input device 40 is arranged in accordance with input device 10.

Figure 15:
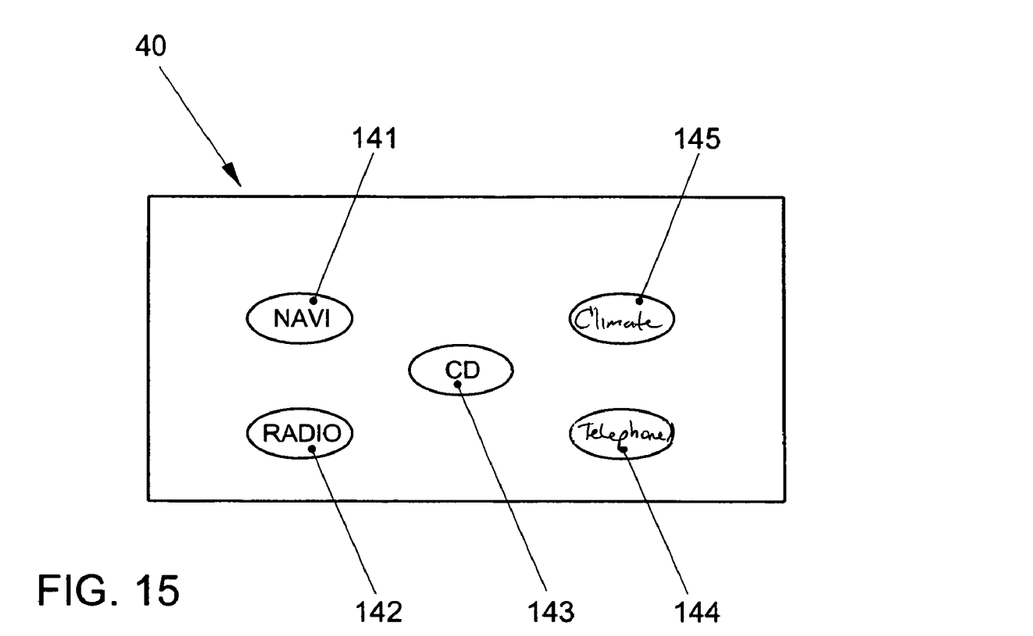
FIG. 15 illustrates an exemplary embodiment for a basic mask illustrated by an input device.

FIG. 15 illustrates display device 40 having a mask base. Display device 40 displays five operating elements 141, 142, 143, 144 and 145, e.g., as ellipses. By touching or pressing operating element 142 in FIG. 15, a mask for operating a radio is called up, and by touching or pressing operating element 143 in FIG. 15, a mask for operating a CD player is called up.

Figure 16:
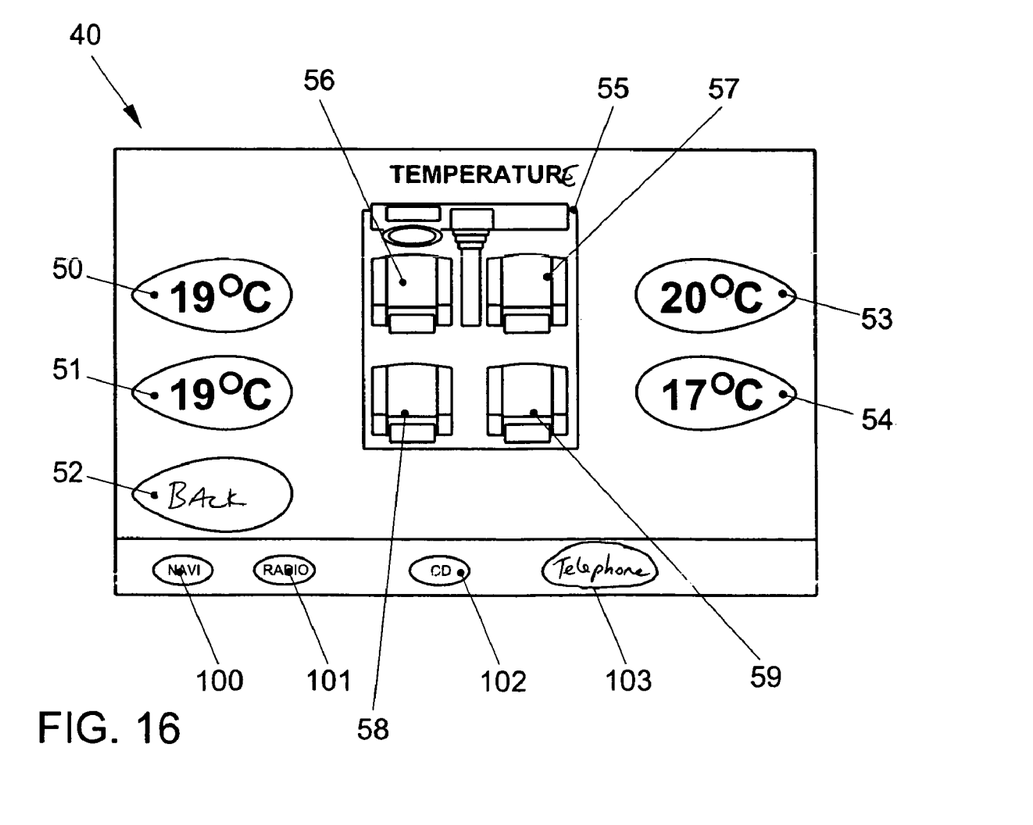
FIG. 16 illustrates an exemplary embodiment for a mask for controlling an air-condition system.

By touching or pressing operating element 145 in FIG. 15, a mask, illustrated in FIG. 16, for operating an air conditioner is called up. In the mask illustrated in FIG. 16, temperature information about the individual locations in the passenger compartment together with operating elements 50, 51, 52, 53 and 54 are displayed, the temperature information relating to currently set temperatures which may be changed via operating elements 50, 51, 53 and 54.

The representation illustrated in FIG. 16 having the title "TEMPERATURE" and the display of a passenger compartment 55 of a motor vehicle makes clear that the temperature setting in the passenger compartment is adjustable individually and specific to the seat. Operating element 50 indicates that a temperature of 19° C. is set for front driver's seat 56.

Operating element 53 indicates that a temperature of 20° C. is set for front passenger's seat 57. For rear seats 58 and 59, 19° C. is set on the left side and 17° C. is set on the right side. Operating element 52 has an assignment, i.e., a function assignment, which is indicated in the display field by "return" (to the next-higher menu display, which is the mask illustrated in FIG. 15).

Figure 17:
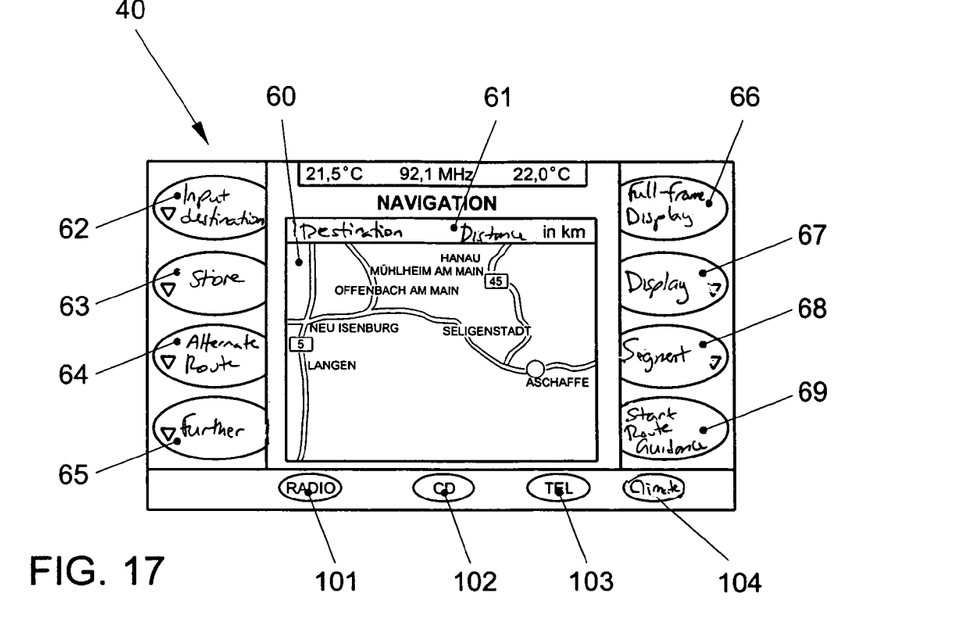
FIG. 17 illustrates an exemplary embodiment for a mask for controlling a navigation system.

By touching or pressing operating element 141 illustrated in FIG. 15, a mask, illustrated in FIG. 17, for operating a navigation system is called up. The mask illustrates a segment of road map 60 of the instantaneous vehicle location, as well as, above road map 60 in a field 61, the destination and the distance to the destination. In addition, operating elements 62, 63, 64, 65, 67 and 68 are displayed, by which, through touching or pressing, submasks may be called up. Furthermore, an operating element 66 is represented for depicting a full-frame display, and an operating element 69 is represented for starting a guidance system. Reference is made to PCT International Published Patent Application No. WO 00/21795 with respect to details concerning the underlaid menu, operating elements 62, 63, 64, 65, 66, 67, 68 and 69 replacing operating elements 3a, 3b, 3c, 3d, 3e, 3f, 3g and 3h described in PCT International Published Patent Application No. WO 00/21795.

Figure 18:
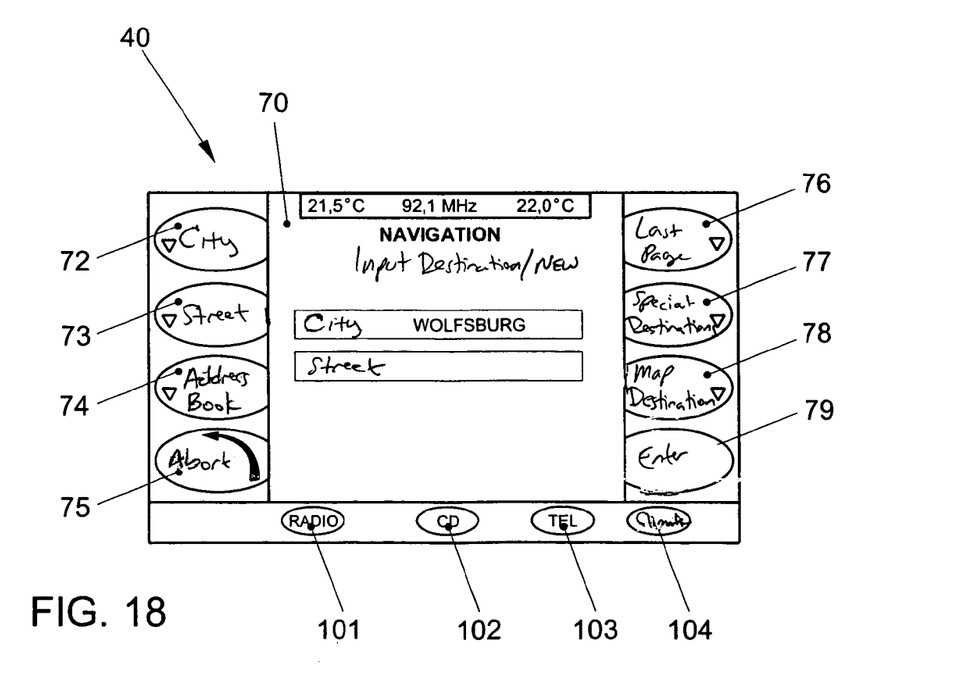
FIG. 18 illustrates an exemplary embodiment for a submask for operating a navigation system.

By touching or pressing operating element 62 illustrated in FIG. 17, a submask illustrated in FIG. 18 is called up which displays the journey destination in a field 70. In addition, operating elements 72, 73, 74, 75, 76, 77, 78 and 79 are displayed by the submask illustrated in FIG. 18. With regard to details pertaining to the underlaid menu, reference is made to PCT International Published Patent Application No. WO 00/21795, operating elements 72, 73, 74, 75, 76, 77, 78 and 79 indicated on the display replacing operating elements 3a, 3b, 3c, 3d, 3e, 3f, 3g and 3h described in PCT International Published Patent Application No. WO 00/21795.

Figure 19:
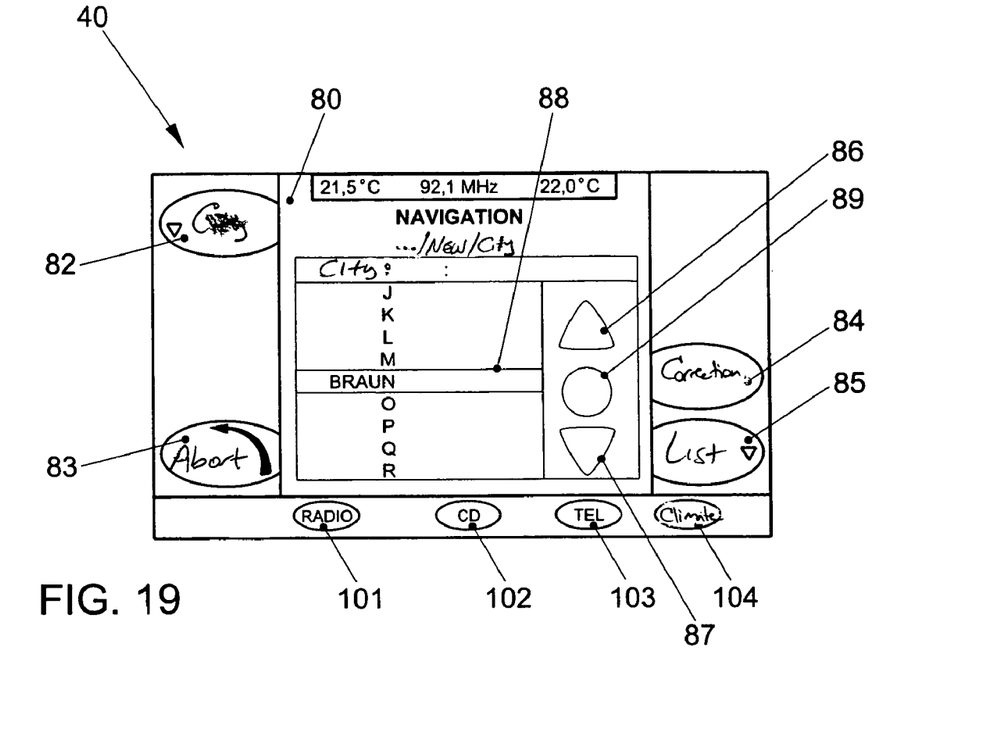
FIG. 19 illustrates an exemplary embodiment for a further submask for operating a navigation system.

By touching or pressing operating element 72 illustrated in FIG. 18, a submask illustrated in FIG. 19 is called up which, in a field 80, displays a destination to be input. Also displayed by the submask illustrated in FIG. 19 are operating elements 82, 83, 84 and 85 which replace operating elements 3a, 3d, 3g and 3h described in PCT International Published Patent Application No. WO 00/21795. An alphabetical-letter selection line 88, as well as operating elements 86, 87 and 89 are indicated in field 80. Alphabetical-letter selection line 88 is movable up or down by touching or pressing operating elements 86 and 87, respectively.

A highlighted alphabetical letter may be selected by touching or pressing operating element 89.

Figure 20:
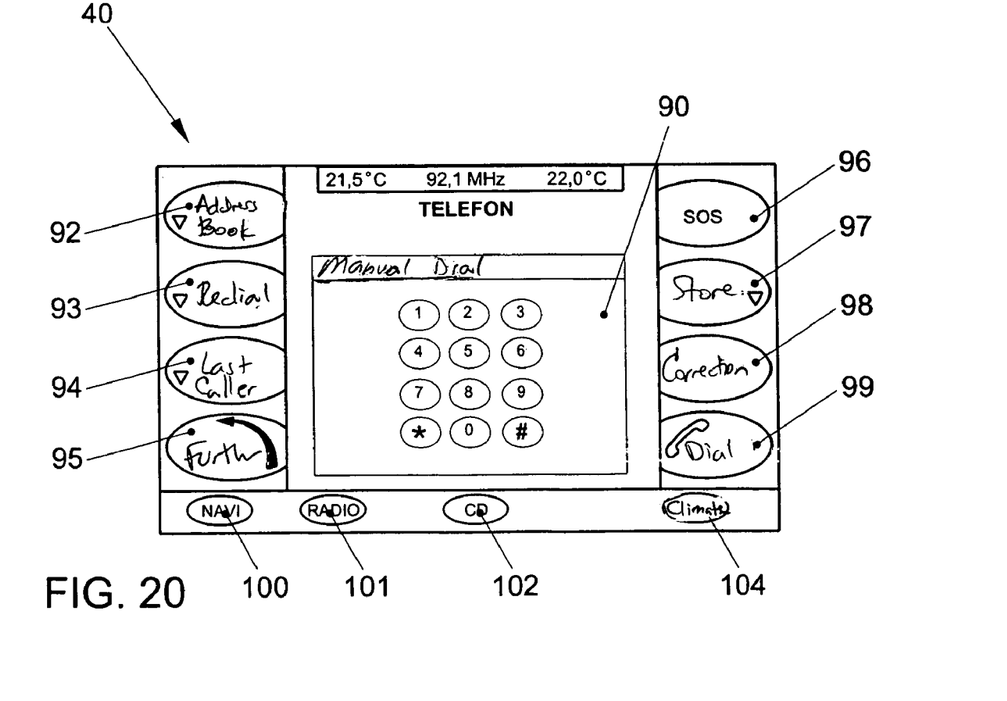
FIG. 20 illustrates an exemplary embodiment for a mask for operating a telephone.

By touching or pressing operating element 144 illustrated in FIG. 15, a mask, illustrated in FIG. 20, for operating a telephone is called up which, in a field 90, displays selector buttons for a telephone. In addition, using the submask illustrated in FIG. 20, operating elements 92, 93, 94, 95, 96, 97, 98 and 99 are indicated, which replace operating elements 3a, 3b, 3c, 3d, 3e, 3f, 3g and 3h described in PCT International Published Patent Application No. WO 00/21795. The selector buttons, displayed in field 90, for a telephone, are arranged as operating elements by which a telephone number may be dialed.

Also shown in the masks and submasks illustrated in FIGS. 15 to 20, respectively, are operating elements 100, 101, 102, 103 and 104 which correspond to operating elements 141, 142, 143, 144 and 145.

A haptic feedback is produced with the aid of operating elements 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97 98, 99, 100, 101, 102, 103, 104, 141, 142, 143, 144 and 145. To that end, the touch screen of display 40 is moved in a manner described with reference to FIGS. 3, 4, 11, 12, 13 or 14 when, by touching or pressing appropriate operating element 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103, 104, 141, 142, 143, 144 or 145, respectively, a user input is implemented, i.e., when the touching, for example, is carried out long enough and/or sufficient pressure has been exerted on the touch screen. This may be advantageous for use in a motor vehicle, since an operator, thus, for example, the driver of a motor vehicle, in this manner receives a confirmation of his/her input without having to look at the display. Safety while driving may thereby be increased.

The device described herein may be transferable to a multifunctional operating device in accordance with German Published Patent Application No. 101 39 693, which is expressly incorporated herein in its entirety by reference thereto. For example, the rotating element described in German Published Patent Application No. 101 39 693 may be replaced by operating elements arranged according to operating elements 86 and 87.

LIST OF REFERENCE NUMERALS 1, 5 cockpit
2, 6 steering wheel
3, 7 instrument panel or dashboard
4, 8, 10, 40 input device
11, 12, 13, 14, 30, 31, 32, 33, 34, 35 spring
15 frame
15A, 15B, 15C, 15D connection element
16 touch screen
16A control panel
17 display
18 actuator
18A drive-shaft neck
19 connecting piece
19A curved region
20 control
21 reference body
25, 27, 303, 304, 313, 314, 323, 324, 333, 334, 343, 344, 353, 354 spring arm
26, 301, 311, 321, 331, 341, 351 connection point
28, 302, 312, 322, 332, 342, 352 opening
29A, 29B, 29C, 29D mounting support 41 movement
42 oscillation
43, 44 envelope curve
45 control signal
49 step function
50, 51, 52, 53, 54, 62, 63, 64,
65, 66, 67, 68, 69, 72, 73, 74, 75, 76, 77, 78, 79, 82, 83, 84, 85,
   86, 87, 89, 92, 93, 94, 95, 96, 97, 98, 99, 100, 101, 102, 103,
   104, 141, 142, 143, 144, 145 operating elements
55 passenger compartment
56 driver seat
57 passenger seat
58, 59 rear seat
60 road map
61, 70, 80, 90 field
88 alphabetical-letter selection line
A, P signal
a, a1, a2, a3, b, b1, b2 variable
D thickness
HR main direction
NR secondary direction
M deflection
S control signal
t time

What is claimed is:

1. An input device, comprising:
   a touch screen configured to input commands by one of (a) touch of a control panel and (b) press on the control panel;
   an actuator configured to move the touch screen in at least one direction with respect to a reference body; and
   at least one substantially u-shaped spring arranged substantially in parallel to the control panel and configured to mechanically connect the touch screen to the reference body.

2. The input device according to claim 1, wherein the reference body includes at least one of (a) a display configured to display information and (b) a component of a motor vehicle.

3. The input device according to claim 1, wherein the at least one substantially u-shaped spring includes at least three substantially u-shaped springs configured to mechanically connect the touch screen to the reference body.

4. The input device according to claim 1, wherein the at least one substantially u-shaped spring includes at least four substantially u-shaped springs configured to mechanically connect the touch screen to the reference body.

5. An input device, comprising:
   a touch screen configured to input commands by one of (a) touch of a control panel and (b) press on the control panel;
   an actuator configured to move the touch screen in at least one direction with respect to a reference body; and
   at least one substantially u-shaped spring configured to mechanically connect the touch screen to the reference body, the substantially u-shaped spring includes an opening substantially directed toward the touch screen.

6. The input device according to claim 1, wherein the substantially u-shaped spring includes an opening and an apex arranged substantially opposite from the opening, the substantially u-shaped spring aligned such that an imaginary line extending through the apex and through the opening extends substantially in parallel to the control panel.

7. The input device according to claim 1, wherein the touch screen is moveable via the actuator substantially in parallel to the control panel.

8. An input device comprising:
   a touch screen configured to input commands by one of (a) touch of a control panel and (b) press on the control panel;
   an actuator configured to move the touch screen in at least one direction with respect to a reference body, the actuator is configured to produce a rotary movement; and
   at least one substantially u-shaped spring configured to mechanically connect the touch screen to the reference body.

9. The input device according to claim 8, wherein an axis of the rotary movement extending substantially perpendicular to the control panel.

10. The input device according to claim 1, wherein the substantially u-shaped spring is substantially made of plastic.

11. The input device according to claim 1, wherein the substantially u-shaped spring includes two spring arms, an opening arranged between the two spring arms and a connection point at which the two spring arms are joined, the substantially u-shaped spring having a main-spring constant in parallel to the opening and a secondary-spring constant in a direction extending through the connection point and through the opening, the secondary-spring constant at least two times the main-spring constant.

12. The input device according to claim 1, wherein the substantially u-shaped spring includes two spring arms, an opening arranged between the two spring arms and a connection point at which the two spring arms are joined, the substantially u-shaped spring having a main-spring constant in parallel to the opening, the substantially u-shaped spring having a secondary-spring constant perpendicular to the opening, the secondary-spring constant at least two times the main-spring constant.

13. The input device according to claim 1, wherein the substantially u-shaped spring includes two spring arms, an opening arranged between the two spring arms and a connection point at which the two spring arms are joined, the substantially u-shaped spring having a main-spring constant in parallel to the opening and the control panel, the substantially u-shaped spring having a secondary-spring constant perpendicular to the opening and in parallel to the control panel, the secondary-spring constant at least two times the main-spring constant.

14. The input device according to claim 1, wherein the at least one substantially u-shaped spring includes at least two substantially u-shaped springs, the input device further comprising at least one mechanical connection element configured to connect the at least two substantially u-shaped springs, the mechanical connection element and the at least two substantially u-shaped springs molded jointly as one piece.

15. The input device according to claim 1, wherein the at least one substantially u-shaped spring includes at least two substantially u-shaped springs, the input device further comprising at least one mechanical connection element configured to connect the at least two substantially u-shaped springs, the mechanical connection element and the at least two substantially u-shaped springs molded jointly as one piece.

16. The input device according to claim 1, wherein the at least one substantially u-shaped spring includes at least three substantially u-shaped springs, the input device further comprising at least one frame configured to connect the at least three substantially u-shaped springs and to accommodate the touch screen, the frame and the at least three substantially u-shaped springs made jointly as one piece.

17. The input device according to claim 1, wherein the at least one substantially u-shaped spring includes at least three substantially u-shaped springs, the input device including at least one frame configured to connect the at least three substantially u-shaped springs and to accommodate the touch screen, the frame and the at least three substantially u-shaped springs molded jointly as one piece.

18. The input device according to claim 1, wherein the at least one substantially u-shaped spring includes at least four substantially u-shaped springs, the input device further comprising at least one frame configured to connect the at least four substantially un-shaped springs and to accommodate the touch screen, the frame and the at least four substantially u-shaped springs both forming one piece.

19. The input device according to claim 1, wherein the at least one substantially u-shaped spring includes at least four substantially u-shaped springs, the input device further comprising at least one frame configured to connect the at least four substantially un-shaped springs and to accommodate the touch screen, the frame and the at least four substantially u-shaped springs molded jointly as one piece.

20. An input device, comprising:
    a touch screen configured to input commands by one of (a) touch of a control panel and (b) press on the control panel;
    an actuator configured to move the touch screen in at least one direction with respect to a reference body; and
    at least one substantially u-shaped spring configured to mechanically connect the touch screen to the reference body, the touch screen is held freely suspended with respect to the reference body by the substantially u-shaped spring.

21. The input device according to claim 1, further comprising a control device configured to control the actuator to move the touch screen in a direction substantially in parallel to the control panel to confirm a command input via the touch screen.

22. The input device according to claim 21, wherein the touch screen is periodically moveable in the direction substantially in parallel to the control panel to confirm the command input via the touch screen.

23. The input device according to claim 22, wherein the touch screen is moveable in the direction substantially in parallel to the control panel for a period of between 50 ms and 800 ms to confirm the command input via the touch screen.

24. An input device, comprising
    a touch screen configured to input commands by one of (a) touch of a control panel and (b) press on the control panel;
    an actuator configured to move the touch screen in at least one direction with respect to a reference body;
    at least one substantially u-shaped spring configured to mechanically connect the touch screen to the reference body; and
    a control device configured to control the actuator to move the touch screen in a direction substantially in parallel to the control panel to confirm a command input via the touch screen, the touch screen is moveable with a decaying oscillation in the direction substantially in parallel to the control panel to confirm the command input via the touch screen.

25. The input device according to claim 24, wherein the decaying oscillation has an envelope curve with an exponential component.

* * * * *

UNITED STATES PATENT AND TRADEMARK OFFICE
CERTIFICATE OF CORRECTION

PATENT NO. : 7,607,087 B2  Page 1 of 1
APPLICATION NO. : 11/051051
DATED : October 20, 2009
INVENTOR(S) : Michael Prados It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this

Twelfth Day of October, 2010

David J. Kappos
*Director of the United States Patent and Trademark Office*